United States Patent Office

2,770,598
Patented Nov. 13, 1956

2,770,598

SOLUBLE OIL

James L. Jezl, Swarthmore, Pa., assignor to Sun Oil Company, Philadelphia, Pa., a corporation of New Jersey No Drawing. Application March 23, 1956,
Serial No. 573,328

5 Claims. (Cl. 252—33.3)

This invention relates to soluble oil compositions comprising mineral oil, alkali metal soap of carboxylic acids obtained by partial oxidation of mineral oil, and an added organic compound.

It is known in the art to prepare soluble oil compositions emulsifiable in water to form oil-in-water emulsions by forming a mixtuure of mineral oil and alkali metal soap of carboxylic acids obtained by partial oxidation of mineral oil. Such compositions may be called for convenience "syntheitc soluble oils" to distinguish them from soluble oil compositions which do not contain soaps of acidic products of oxidation of mineral oil. Major problems involved in the preparation of synthetic soluble oil compositions have been the obtaining of a stable, homogeneous mixture of oil and soap prior to emulsification, and the obtaining of a stable emulsion after emulsification. The present invention provides a highly stable, homogeneous mixture of oil and soap, and a highly stable emulsion, these effects being obtained by the incorporation in the soluble oil composition of an organic compound as "coupling agent" or "mutual solvent," i. e., solvent for both oil and water. The organic compound employed has a dual function since it both stabilizes the soluble oil prior to emulsification and stabilizes the emulsion after emulsification.

The compound employed as coupling agent in synthetic soluble oils according to the invention is a compound selected from the group consisting of compounds having the formula $RCH_2O(CH_2CH_2O)_nH$ and compounds having the formula $RCOO(CH_2CH_2O)_nH$, R in each formula being a radical having 4 to 21 carbon atoms inclusive and selected from the group consisting of aliphatic and cycloaliphatic radicals, and $n$ in each formula being an integer greater than 3 and within the range from $(x-4)$ to $(x+4)$, where $x$ is the number of carbon atoms in R. Preferably, $n$ is within the range from $(x-2)$ to $(x+2)$ inclusive.

The compound employed is an ether or an ester of a polyethylene glycol wherein $n$ is the number of ethylene glycol units in the molecule. That number must be within the range from $(x-4)$ to $(x+4)$ as above stated; for example, a rosin ester or ether, in which R has 19 carbon atoms, must contain 15 to 23 ethylene glycol units inclusive in order to be suitable for use according to the invention. As shown subsequently in the examples, a rosin ester of a polyethylene glycol having only 10 ethylene glycol units, for example, does not provide satisfactory emulsion stability in emulsions of synthetic soluble oils.

The number of ethylene glycol units in the molecule must be at least 4, if satisfactory results are to be obtained, and is preferably at least 10. As shown subsequently, in the examples, an ethyl ether of a polyethylene glycol having only 2 ethylene glycol units does not give satisfactory emulsion stability in emulsions of synthetic soluble oils.

The radical represented by R in the preceding formulas may be a straight- or branched-chain aliphatic radical or a cycloaliphatic radical, or an aliphatic-substituted cycloaliphatic radical; it may be saturated or unsaturated. Suitably the radical $RCH_2$, may be the following: hexyl, octyl, decyl, tetradecyl, octadecyl, eicosyl, docosyl, palmityl, oleyl, rosinyl, naphthenyl, or cyclohexyl, etc., and the radical RCOO, may be the following: hexanoate, octanoate, decanoate, tetradecanoate, octadecanoate, arachidate, behenate, oleate, rosinate, naphthenate, or cyclohexanecarboxylate, etc.

Preferred cycloaliphatic radicals are the rosinyl and rosinate radicals, as provided by rosin alcohols and rosin acids respectively. A rosin acid as contemplated in the present invention is one having the formula $C_{19}H_{29}COOH$ and naturally occurring in rosin, e. g. abietic acid, sapinic acid, d-pimaric acid, etc., or a product thereof obtained by hydrogenation, dehydrogenation, or disproportionation of the $C_{19}H_{29}$ radical. A rosin alcohol, as contemplated herein is an alcohol obtainable by reduction of the carboxyl group of a rosin acid and includes such alcohols as abietyl alcohol, dihydroabietyl alcohol, dehydroabietyl alcohol, sapinyl alcohol, dihydrosapinyl alcohol, pimaryl alcohol, dehydropimaryl alcohol, etc. Esters of various mixtures of rosin acids are within the scope of the invention, e. g. rosin itself. Similarly, ethers of various mixtures of rosin alcohols are within the scope of the invention, e. g., the mixture obtained by treating rosin under conditions to reduce the carboxyl groups of the rosin acids contained therein.

The soluble oil composition according to the present invention comprises mineral oil, alkali metal soap of carboxylic acids obtained by partial oxidation of mineral oil, and a minor proportion of an organic compound as specified above. It is generally preferred that the composition should also contain other constituents such as petroleum sulfonates and small amounts of excess alkali metal hydroxide and water. In some cases, it may be desirable to incorporate in the soluble oil, alkali metal soap of petroleum naphthenic acids. Also, in some cases, it may be desirable to incorporate in the soluble oil the entire product of oxidation of mineral oil, rather than just a predominantly carboxylic acid portion thereof.

The organic compound employed according to the invention as a coupling agent or mutual solvent for synthetic soluble oils may be used if desired in conjunction with other coupling agents or mutual solvents, e. g., monobutyl ether of ethylene glycol. Also, mixtures of two or more coupling agents according to the present invention may be employed.

The mineral lubricating oil employed in the soluble oil composition according to the invention preferably has S. U. viscosity at 100° F. within the range from 40 to 120. The mineral oil which is used as oxidation charge, on the other hand, preferably has S. U. viscosity at 100° F. within the range from 125 to 200. A preferred oxidation charge is petroleum foots oil, but mineral lubricating oils may also be used. Mineral oil, as the term is used in connection with the oxidation charge, is understood to include petroleum wax, preferably paraffin wax having melting point not greater than 100° F., as well as normally liquid oils.

Petroleum foots oil is the oily byproduct obtained in the deoiling of slack wax. When the deoiling is done by sweating, the foots oil is sometimes called sweat oil or sweater oil. When the deoiling is done by filtration of a solution of the slack wax in a solvent for oil, the filtrate obtained is a solution of foots oil in the solvent used, e. g. methyl ethyl ketone or mixtures thereof with toluene and/or benzene. Petroleum foots oils generally contain substantial amounts of low-melting wax in addition to lubricating oil, the amount of wax depending on the filtration temperature and other variables.

The oxidation charge should have sufficiently low content of aromatic compounds so that there is no substantial inhibition of the oxidation by aromatic compounds. Therefore, a preferred foots oil charge is one obtained from deoiling of slack wax from a solvent-refined lubricating oil, e. g. a furfural-refined lubricating oil.

The oxidized mineral oil employed in compositions according to the invention can be prepared in any suitable way. For example, it may be prepared by contacting the heated charge oil in liquid state with a free-oxygen-containing gas, e. g. air, oxygen, ozonized air, etc. The oxidation is preferably conducted under atmospheric pressure or relatively low elevated pressure not exceeding, for example 100 p. s. i. g. Such operation is advantageous in that the vent gases carry off some of the lower-boiling acidic products, which are undesirable in the soluble oil, and which in operation at higher pressures would remain in the liquid oxidation product. The oxidation is preferably conducted in the presence of an oxidation catalyst, such as manganese naphthenate, manganese soaps of fatty acids, manganese soaps of carboxylic acids obtained in previous oxidations of mineral oil, etc.

The oxidation preferably is continued at least until the saponification number of the liquid oxidation product is 60, and is terminated before the saponification number of the liquid oxidation product exceeds 120, preferably before the saponification number exceeds 100. Oxidation to too high a saponification number tends to result in formation of oxidation products which have adverse effect on the soluble oil.

Preferably the sulfonate concentration of synthetic soluble oils according to the invention is sufficient to provide a sulfonate saponification number equivalent of at least 3. Generally, the sulfonate saponification number equivalent is not greater than 10, more preferably not greater than 7. The sulfonate saponification number equivalent is determined by measurement in mg. of KOH per gram, of the saponification number of the sulfonate-containing material prior to mixing with other saponifiable components of the soluble oil, and multiplying the saponification number thus obtained by the weight fraction of the sulfonate-containing material in the compounded soluble oil.

Preferably, the concentration of carboxyl-containing materials in the soluble oils according to the invention is sufficient to provide a carboxylate saponification number equivalent of at least 10, more preferably at least 14. Generally, the carboxylate saponification number equivalent is not greater than 20, more preferably not greater than 17. In cases where both naphthenic acid soaps and oxidation product soaps are employed, the naphthenic acid soaps and oxidation product soaps each preferably provide carboxylate saponification number equivalent within the approximate range from 5 to 10. The carboxylate saponification number equivalent may be determined in a manner generally similar to that described for determination of sulfonate saponification number equivalents.

The synthetic soluble oils according to the invention are preferably alkaline, having for example free alkalinity within the range 0.01 to 0.12 percent as NaOH.

A preferred range of coupling agent concentration in the soluble oil according to the invention is from 1.25 to 3.0 volume percent, more preferably from 1.75 to 2.5 volume percent. A preferred range of water concentration in the soluble oil is from 2.25 to 5.0 volume percent, more preferably from 2.5 to 3.25 volume percent. Generally, for a given soluble oil there should be at least a certain amount of coupling agent to obtain satisfactory results, but this amount varies for different properties and relative proportions of the other constituents of the soluble oil. Also, there should generally, for satisfactory results, be a water content within certain upper and lower limits, but these limits also vary for different properties and relative proportions of the other constituents of the soluble oil.

Polyethylene glycol ethers employed according to the invention may be mixtures of various ethers having different numbers of ethylene glycol units per molecule. The average number of ethylene glycol units per molecule in such mixtures is the basis to be used in determining whether the mixture is suitable for use according to the invention. The average number of ethylene glycol units may be considered to be a number such that the molar equivalents of constituents having lesser number of ethylene glycol units per molecule are approximately equal in the mixture to the molar equivalents of constituents having greater numbers of ethylene glycol units per molecule.

The following examples illustrate the invention:

Example 1

Synthetic soluble oils were prepared by mixing the following materials in the stated amounts:

| | |
|---|---|
| Mineral lubricating oil_____grams__ | 490 |
| Partially oxidized petroleum foots oil_____do____ | 108 |
| Petroleum naphthenic acids_____do____ | 140 |
| Petroleum mahogany sulfonates (10.9% solution in mineral oil)_____grams__ | 250 |
| Caustic soda, 50° Bé_____milliliters__ | 17 | adjusting the water content of the soluble oil at various levels, and adding in various concentrations a coupling agent, as subsequently specified.

The lubricating oil used had S. U. viscosity at 100° F. of about 100. The naphthenic acids had saponification number of 61. The petroleum sulfonates were sodium soaps of sulfonic acids having saponification number of 13.2, and contained 1.80 weight percent organic $SO_3$.

The oxidized foots oil was prepared by partially oxidizing a foots oil obtained in the solvent deoiling of slack wax, the oxidation being performed at 260–320° F. and atmospheric pressure by blowing air through the foots oil containing a manganese-naphthenate containing catalyst. The oxidation was continued until the saponification number of the liquid oxidation product was 78.0 and 108 grams of the product were then incorporated in the soluble oil.

The naphthenic acids and oxidized foots oil each contributed 8.5 saponification number equivalent to the soluble oils, and the sulfonates contributed 3.3 saponification number equivalent. The compounded soluble oil had free alkalinity of about 0.09–0.10 percent as NaOH.

Each soluble oil composition was tested for stability by allowing it to stand at 10° F. for 48–72 hours and then observing the soluble oil at room temperature to determine whether any oil had separated from the soluble oil to form an upper oil layer, and whether there were any signs of haziness or gelation in the soluble oil. Each soluble oil was rated as stable if there were no discernible oil separation, haziness, or gelation; otherwise, unstable.

Each soluble oil was also tested for emulsion stability by emulsifying 10 ml. of the soluble oil in 90 ml. of added 45° F. tap water having calcium hardness less than 100 p. p. m. as $CaCO_3$, allowing the emulsion to come to room temperature while standing for 24 hours, at the end of which time the appearance of the emulsion was observed. The emulsion was rated stable if the emulsion surface was bright, or if it was only slightly dull, with very little or no "cream" on the emulsion surface. The emulsion was rated unstable if there was a substantial amount of cream or "scum" or free oil on the emulsion surface.

The coupling agent used in the present example was a trimethyl nonyl ether of polyethylene glycol having an average of about 12 ethylene glycol units per molecule, and may be represented by the following average formula: $(CH_3)_3C_9H_{16}O(CH_2CH_2O)_{12}H$. The following table shows the results obtained with various combination of water content and coupling agent content.

| Vol. Percent Water | Vol. Percent Coupling Agent | Oil Stability | Emulsion Stability |
|---|---|---|---|
| 2.5 | 1.5 | Stable | Stable. |
| 2.5 | 2.0 | ---do--- | Do. |
| 3.5 | 1.5 | ---do--- | Do. |

This table shows that satisfactory results are obtained with water contents from 2.5 to 3.5 volume percent and coupling agent contents from 1.5 to 2.0 volume percent.

*Example II*

The synthetic soluble oils prepared in Example I were tested for emulsion stability in hard water emulsions. The emulsions were prepared by emulsifying 10 parts by volume of the soluble oil in 90 parts by volume of 45° F. hard water containing 300 p. p. m. of calcium hardness as CaCO3 and 100 p. p. m. of chloride hardness as NaCl. The emulsions were allowed to come to room temperature while standing for 24 hours, at the end of which time the emulsions were observed to determine their stabilities. An emulsion was rated stable if there was light cream or scum, or no cream or scum on the emulsion surface; unstable if there was heavy cream or scum, or free oil in the emulsion surface. Relatively soft water emulsions, as described in Example I, were rated somewhat more rigorously than relatively hard water emulsions as in the present example, since hard water emulsions generally tend to be less stable than corresponding soft water emulsions, and the soft water emulsions are therefore subjected to a higher standard, in order to provide that a satisfactory soluble oil from the standpoint of soft water emulsions will also, in most instances, be satisfactory from the standpoint of hard water emulsions.

The following results were obtained, the oil stabilities having been observed after one month at 70° F.:

| Vol. Percent Water | Vol. Percent Coupling Agent | Oil Stability | Emulsion Stability |
|---|---|---|---|
| 2.6 | 1.5 | Stable | Stable. |
| 2.8 | 1.5 | ---do--- | Do. |
| 3.0 | 1.5 | ---do--- | Do. |
| 3.2 | 1.5 | ---do--- | Do. |

This table shows that satisfactory results in hard water emulsion are obtained with a coupling agent comprising trimethyl nonyl ether of polyethylene glycol having an average of 12 ethylene glycol units per molecule.

*Comparison Example I*

Synthetic soluble oils were prepared in the same manner disclosed in Example I except that a different coupling agent was used in place of the coupling agent used in Example I. The coupling agent was employed in various combinations of water and coupling agent contents within the ranges of 2 to 4 volume percent water and 0.5 to 2.0 volume percent coupling agent. The coupling agent employed was the ethyl mono-ether of diethylene glycol. Only one of the soluble oils contained with this coupling agent was stable, and that one soluble oil did not provide a stable emulsion.

The above results shows that ethyl mono-ether of diethylene glycol is unsuitable for use in the synthetic soluble oil of this example, whereas the coupling agents according to the present invention are highly suitable for such use.

*Example III*

Synthetic soluble oils were prepared in the same manner as described in Example I except that a rosinyl alcohol ($C_{19}H_{29}CH_2OH$) ether of polyethylene glycol having an average of 20 ethylene glycol units per molecule, as represented by the formula, $$C_{19}H_{29}CH_2O(CH_2CH_2O)_{20}H,$$

was employed as coupling agent in place of the coupling agent used in Example I.

The following table shows the results obtained with various water contents and 1.5 volume percent coupling agent content:

| Vol. Percent Water | Vol. Percent Coupling Agent | Oil Stability | Emulsion Stability |
|---|---|---|---|
| 2.5 | 1.5 | Stable | Stable. |
| 3.0 | 1.5 | ---do--- | Do. |

The above table shows that satisfactory results are obtained with water contents from 2.5 to 3.0 percent and coupling agent contents of 1.5 percent.

*Example IV*

Synthetic soluble oils were prepared and tested in the same manner described in Example I except that rosin acid mono-ester of polyethylene glycol having an average of 15 ethylene glycol units per molecule, as represented by the formula, $C_{19}H_{29}COO(CH_2CH_2O)_{15}H$, was used in place of the coupling agent employed in Example I. The following table shows the results obtained with one combination of water content and coupling agent content:

| Vol. Percent Water | Vol. Percent Coupling Agent | Oil Stability | Emulsion Stability |
|---|---|---|---|
| 3.5 | 2.0 | Stable | Stable. |

This table shows that satisfactory results are obtained with water content of 3.5 volume percent and coupling agent content of 2.0 volume percent.

*Comparison Example II*

Synthetic soluble oils were prepared and tested in the same manner disclosed in Example I except that rosin acid mono-ester of polyethylene glycol having an average of 10 ethylene glycol units per molecule was employed as coupling agent in place of the coupling agent used in Example I. Various combinations of water and coupling agent contents in the ranges of 2.0 to 4.0 volume percent water and 0.5 to 2.0 volume percent coupling agent were tried, but no stable emulsion could be obtained.

Comparison of the present example IV shows that the coupling agent of Example IV having 15 ethylene glycol units per molecule is a suitable coupling agent for use in synthetic soluble oils whereas the coupling agent of the present example having 10 ethylene glycol units per molecule is unsuitable for use in synthetic soluble oils.

The synthetic soluble oil of Example III containing as coupling agent rosin ester of polyethylene glycol having an average of 20 ethylene glycol units per molecule, is emulsifiable in hard water containing 300 p. p. m. of calcium hardness as CaCO3 and 100 p. p. m. of chloride hardness as NaCl, to form stable, 10 percent emulsions when the soluble oil prior to emulsification contains 1.5 volume percent of coupling agent and 2.5 to 3.0 volume percent of water.

The preferred coupling agent and water concentrations vary for different coupling agents within the scope of the invention. The following table shows the preferred concentrations in volume percent for several coupling agents in the particular soluble oils of the examples.

| Coupling Agent | Preferred Coupling Agent Concentration | Preferred Water Concentration |
|---|---|---|
| Dodecyl ether, 12 glycol units per molecule | 1.25 to 3.0 | 2.25 to 3.75 |
| Rosinyl alcohol ether, 20 glycol units | 1.25 to 1.75 | 2.25 to 3.25 |
| Rosin acid ester, 15 glycol units | 1.75 to 2.25 | 3.25 to 3.75 |

The properties of the oxidation product which is employed in synthetic soluble oils affect substantially the ease with which oil stability and emulsion stability can be imparted to the soluble oil by use of a coupling agent. The coupling agents according to the invention are particularly advantageous in that they are capable of imparting oil stability and emulsion stability to synthetic soluble oils which contain an oxidation product which makes the soluble oil relatively quite difficult to stabilize.

This application is a continuation-in-part of copending application Serial No. 320,356 filed November 13, 1952, by the present inventor, now abandoned.

The invention claimed is:

1. A soluble oil composition comprising: mineral lubricating oil; alkali metal soap of petroleum mahogany sulfonic acids; alkali metal soap of petroleum naphthenic acids; alkali metal soap of carboxylic acids obtained by partial oxidation of mineral oil; 2.25 to 5.0 volume percent of water; and 1.25 to 3.0 volume percent of a compound selected from the group consisting of compounds having the formula $RCH_2O(CH_2CH_2O)_nH$ and compounds having the formula $RCOO(CH_2CH_2O)_nH$, R in each formula being a radical having 4 to 21 carbon atoms inclusive and selected from the group consisting of aliphatic and cycloaliphatic radicals, and $n$ in each formula being an integer greater than 3 and within the range from $(x-4)$ to $(x+4)$ where $x$ is the number of carbon atoms in R; said soluble oil having sulfonate saponification number equivalent within the range from 3 to 10 mg. of KOH per gram and carboxylate saponification number equivalent within the range from 10 to 20 mg. of KOH per gram.

2. Composition according to claim 1 wherein said compound is a dodecyl ether of a polyethylene glycol having about 12 ethylene glycol units per molecule.

3. Composition according to claim 1 wherein said compound is a rosinyl ether of a polyethylene glycol having about 20 ethylene glycol units per molecule.

4. Composition according to claim 1 wherein said compound is a rosin acid ester of a polyethylene glycol having about 15 ethylene glycol units per molecule.

5. A soluble oil composition comprising: mineral lubricating oil having S. U. viscosity at 100° F. within the range from 40 to 120 seconds; alkali metal soap of petroleum mahogany sulfonic acids; alkali metal soap of petroleum naphthenic acids; a saponified oxidation product mixture obtained by partially oxidizing petroleum foots oil in liquid phase at a temperature in the range from 260° F. to 320° F. and a pressure from atmospheric to 100 p. s. i. g. in the presence of a metallic oxidation catalyst until the saponification number of the oxidation product mixture is within the range from 60 to 120 mg. of KOH per gram, and saponifying said oxidation product mixture with an alkali metal basic compound; 2.25 to 5.0 volume percent of water; and 1.25 to 3.0 volume percent of a compound selected from the group consisting of compounds having the formula $RCH_2O(CH_2CH_2O)_nH$ and compounds having the formula $RCOO(CH_2CH_2O)_nH$, R in each formula being a radical having 4 to 21 carbon atoms inclusive and selected from the group consisting of aliphatic and cycloaliphatic radicals, and $n$ in each formula being an integer greater than 3 and within the range from $(x-4)$ to $(x+4)$ where $x$ is the number of carbon atoms in R; said soluble oil having sulfonate saponification number equivalent within the approximate range from 3 to 10 mg. of KOH per gram and carboxylate saponification number equivalent within the approximate range from 10 to 20 mg. of KOH per gram, approximately half of said carboxylate saponification number equivalent being supplied by said oxidation product mixture.

References Cited in the file of this patent

UNITED STATES PATENTS

| | | |
|---|---|---|
| 2,043,922 | Burwell | June 9, 1936 |
| 2,470,913 | Bjorksten | May 24, 1949 |
| 2,626,240 | Deutser | Jan. 20, 1953 |

OTHER REFERENCES

Metal Working Lubricants, Bastian, McGraw Hill Pub. Co., 1951, page 16.

Surface Active Agents, Schwartz and Perry, Interscience Pub. Co., 1949, pages 204 and 205.